United States Patent [19]
Elbers et al.

[11] 3,911,760
[45] Oct. 14, 1975

[54] VARIABLE RATIO BRAKE PEDAL LINKAGE

[75] Inventors: Arthur H. Elbers, Holt; David B. Headley, Eaton Rapids, both of Mich.

[73] Assignee: General Motors Corporation, Detroit, Mich.

[22] Filed: Oct. 2, 1974

[21] Appl. No.: 511,216

[52] U.S. Cl. .................................. 74/512; 74/516
[51] Int. Cl.² .......................................... G05G 1/14
[58] Field of Search ...................... 74/516, 512, 469

[56] References Cited
UNITED STATES PATENTS
| | | | |
|---|---|---|---|
| 2,884,803 | 5/1959 | Willis | 74/512 |
| 3,025,713 | 3/1962 | Koshaba et al. | 74/512 X |

Primary Examiner—Samuel Scott
Assistant Examiner—F. D. Shoemaker
Attorney, Agent, or Firm—D. D. McGraw

[57] ABSTRACT

A four bar link variable ratio brake pedal linkage arrangement in which the pedal arm is pivoted to a fixed mounting bracket, a bellcrank is also pivoted to the fixed mounting bracket and has a connection to the brake push rod connecting to the brake booster, and a movable link is pivotally connected to the pedal arm and to the bellcrank so that when the brake pedal is depressed by the operator, the movable link exerts a tension force on the bellcrank, causing the bellcrank to pivot and to transmit force to the push rod. As the location of the movable pivot points change, the ratio of the linkage changes.

4 Claims, 5 Drawing Figures

VARIABLE RATIO BRAKE PEDAL LINKAGE

The invention relates to a variable ratio brake pedal linkage which provides increased output pressure from the master cylinder operated by the linkage even though the normally operative brake booster becomes inoperative. This gives an increased no-power assist which provides increased brake pressure as compared to a system having a constant ratio pedal linkage. The arrangement has a higher mechanical advantage during the first portion of brake pedal travel and a reduced mechanical advantage during the latter portion of the brake pedal travel. The ratios obtained may be tailored to match other system characteristics so that the linkage is effective for both power and no-power operation. It is particularly applicable to brake apply systems which would otherwise have a high, hard pedal without the normal power assistance being available or during normal braking conditions.

The system in its preferred form replaces a typical constant ratio brake pedal having a nominal 3:1 ratio. In a passenger car, the inital ratio of push rod output force to brake pedal input force is preferably about 4.7:1 and gradually decreases as the pedal moves in the brake apply direction until the ratio is about 1.7:1 at full brake pedal travel. The preferred arrangement will then have about the same push rod travel and pedal arc as the constant ratio linkage which it replaced.

IN THE DRAWINGS

Figure 1:
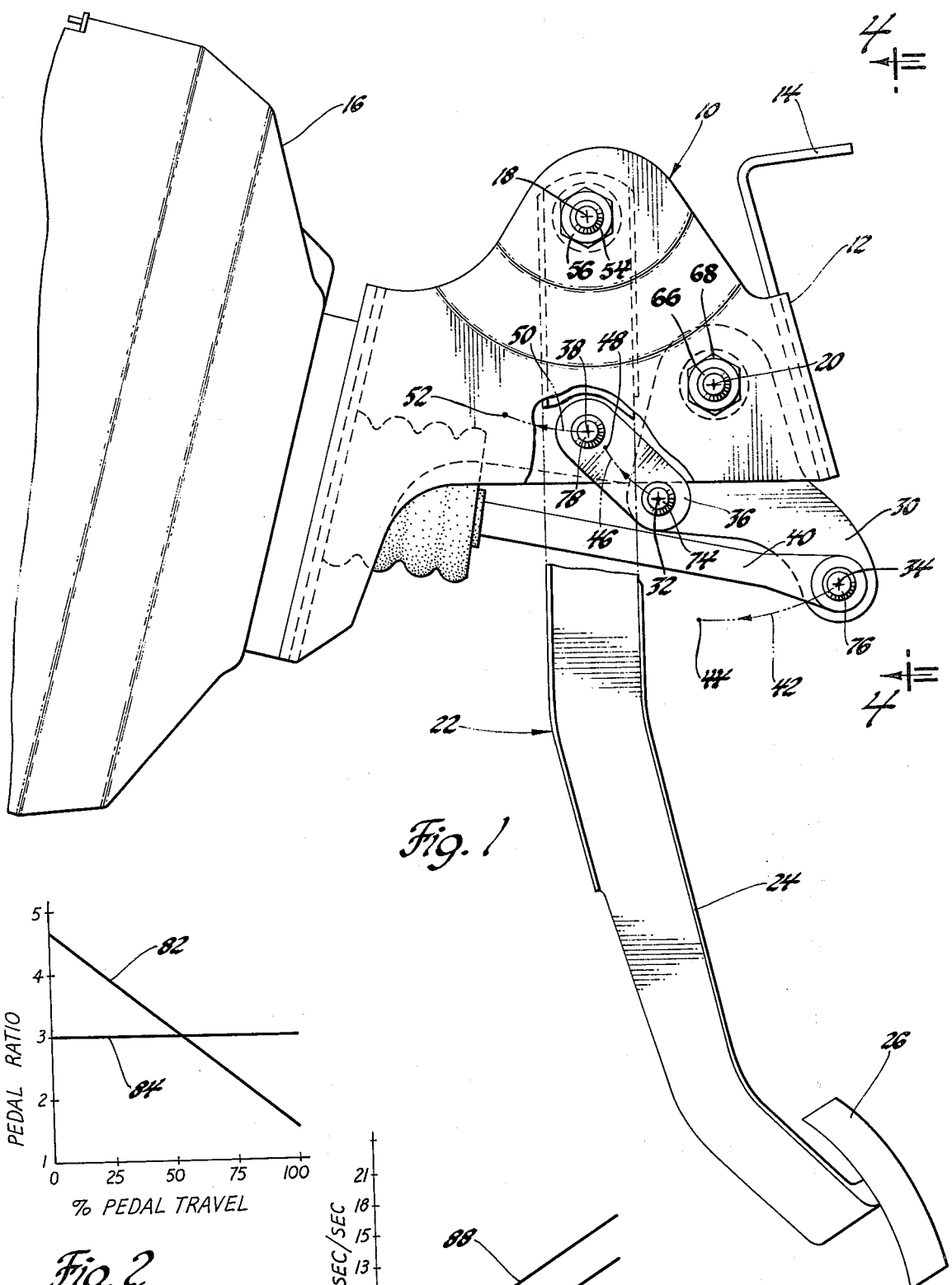
FIG. 1 is a elevation view, with parts broken away and in section, of a brake pedal linkage embodying the invention.

The pedal linkage 10 includes a support bracket 12 fixed to a suitable portion 14 of the vehicle in which the assembly is installed. A brake booster 16 is also mounted on the vehicle in a manner well known in the art and is illustrated as being mounted on the support bracket 12. A master cylinder assembly, not shown, is actuated by the brake booster 16 in the usual manner. As is also known in the art, the brake booster permits mechanical push-through operation when for any reason no boost power is available. Pivots 18 and 20 are provided on support bracket 12 so that the support bracket becomes a fixed bar in the brake pedal linkage arrangement. The brake pedal assembly 22 includes a brake pedal arm 24 with the brake pedal 26 on the lower end thereof so that the pedal is of the suspended type. The other end of arm 24 is pivotally mounted on pivot 18 so that the brake pedal may be moved by the vehicle operator in the usual manner in a brake apply direction. This direction is clockwise as seen in FIG. 1.

A bellcrank lever 30 has three pivot points thereon, one of which is arranged so as to pivot on pivot 20. The other pivot points 32 and 34 are on other portions of the bellcrank lever 30 so that the three pivot points define the points of a triangle. A connecting link 36 is pivotally attached to bellcrank lever 30 at pivot point 32 and is also pivotally attached at pivot 38 to a portion of brake pedal arm 24 intermediate pivot 18 and brake pedal 26. A push rod 40 is pivotally attached to bellcrank lever 30 at pivot point 34 and is the input member of the brake booster 16.

In the brake released position shown in FIG. 1, pivots 20 and 38 are at substantially the same distance from pivot 18. A line joining pivots 18 and 20 forms an acute angle with a similar line joining pivots 18 and 38. A line joining pivots 18 and 32 passes between pivots 20 and 38, with pivot 32 being positioned further away from pivot 18 than either pivot 20 or pivot 38. Pivot 34 lies closely adjacent an extension of the line joining pivots 18 and 20 and is further away from pivot 18 than any of the other three pivots. When the bellcrank lever 30 pivots clockwise about pivot 20, pivot point 34 will follow the pivot path indicated by dashed arrow 42 until it reaches point 44 at 100% brake pedal travel. Pivot 32 will at the same time follow a pivot path indicated by dashed arrow 46 until it reaches point 48 at 100 percent brake pedal travel. Pivot 38 will follow the pivot path indicated by dashed arrow 50 until it reaches point 52 at 100 percent brake pedal travel. It is noted that pivot points 32 and 34 pivot about pivot 20, while pivot point 38 pivots about pivot 18. The arrangement is such that substantially linear movement of the push rod 40 is obtained.

The mechanical arrangement of pivot 18 includes a bolt 54 having a nut 56 holding a steel inner spacer 58 between spaced portions of support bracket 12 and plastic bushings 60 and 62 on either side of brake pedal arm 24. Pivot 20 is somewhat similarly constructed, using a bolt 66 and nut 68, steel inner spacer 70 and plastic bushing 72. The pivot pins 74 and 76, respectively located at pivot points 32 and 34, may be press fitted in bellcrank lever 30 and are arranged to receive apertured portions of connecting link 36 and push rod 40. Pin 78 is pressed into lever 22 at pivot point 38. Suitable antirattle springs 80 may be used in conjunction with the pivot pins.

Figure 2:
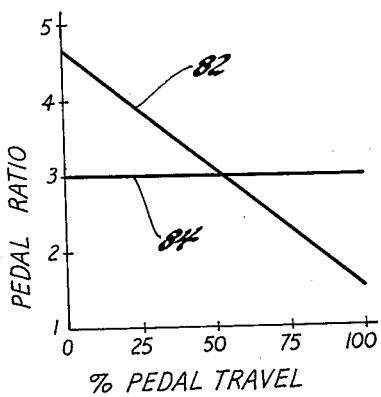
FIG. 2 is a graph of pedal ratio versus pedal travel for a constant ratio pedal and the variable ratio pedal linkage embodying the invention.
Figure 3:
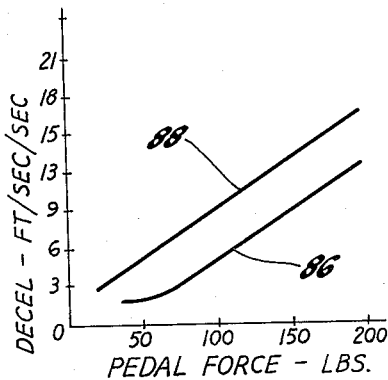
FIG. 3 is a graph of brake performance, plotting pedal force against deceleration rate and comparing the performance of a constant ratio pedal and variable ratio pedal linkage embodying the invention.
Figure 4:
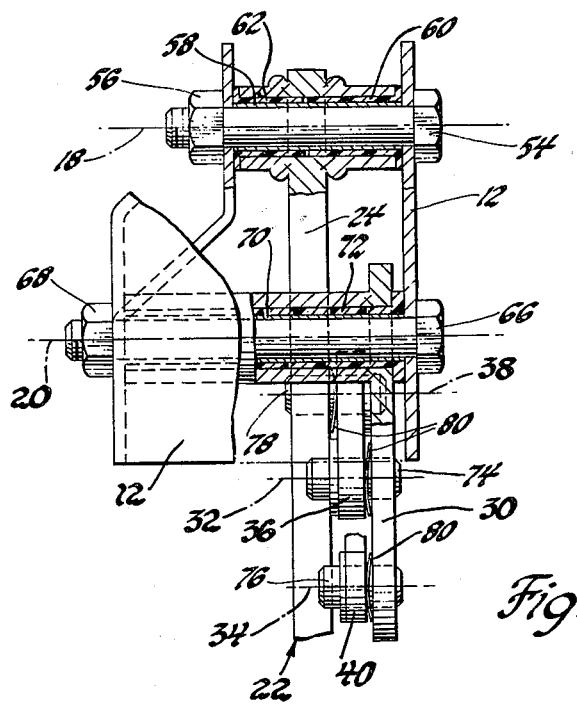
FIG. 4 is a view of a portion of the linkage of FIG. 1 taken in the direction of arrows 4—4 of that figure and having parts broken away and in section.
Figure 5:
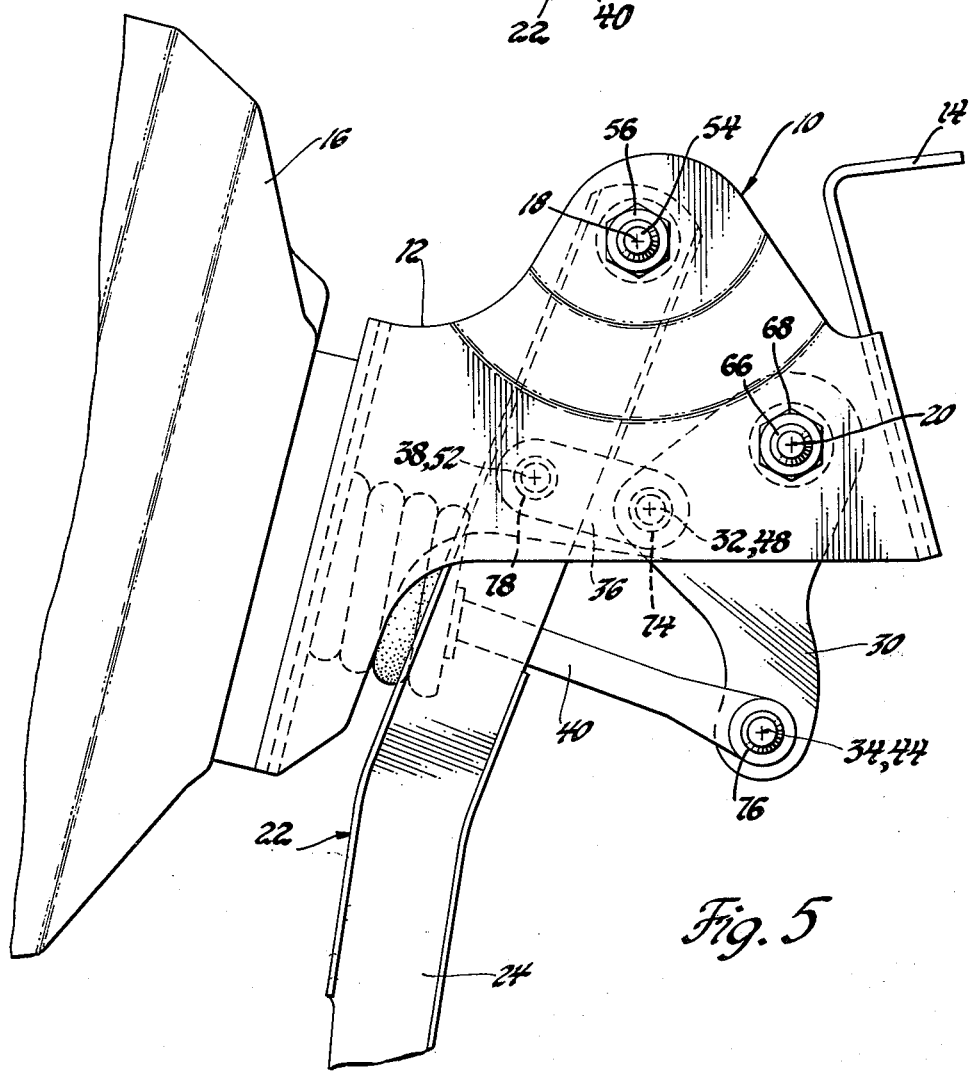
FIG. 5 is a view similar to FIG. 1 but showing the linkage in the full brake apply position.

As the vehicle operator exerts an input force on the brake pedal 26 he creates a moment in the brake pedal arm 24 about pivot 18. Thus the brake pedal arm is a force input arm. The brake pedal moment is transferred from pivot 38 to pivot 32 on the bellcrank lever 30 by means of the connecting link 36. The bellcrank lever then transfers the moment to the push rod 40, which is a force output member, at pivot point 34. As the brake pedal arm continues to move clockwise about the pivot 18 the pivot points move along their respective paths. Upon the attainment of 100 % brake pedal travel, illustrated in FIG. 5, the linkages have changed position so the pivot point 34 is located at point 44, pivot point 32 is located at point 48, and pivot point 38 is located at point 52. The change in ratio through the pedal travel is illustrated by curve 82 of the graph of FIG. 2. Curve 84 of that graph shows for comparison a constant pedal ratio throughout the range of pedal travel, which is typical of constant ratio linkages. The graph of FIG. 3 shows the brake performance of a constant ratio pedal linkage by means of curve 86 and the performance of the variable ratio pedal linkage embodying the invention by means of curve 88. It can be seen that the pedal force exerted in the variable ratio pedal linkage gives a substantially constant increase in deceleration rate with pedal force increase at a higher level of deceleration than that obtained by the constant ratio pedal. The variable ratio pedal linkage is particularly advantageous in the inital application of brake force, obtaining considerably higher deceleration rates during the first half of the brake pedal travel. This yields an important assist in obtaining higher braking rates than is the case when a constant ratio linkage is used.

In a preferred embodiment of the linkage, the brake pedal arm 24 will rotate about 23° from the initial position to the full brake apply position; the connecting link 36 will rotate a slightly less amount, about 22.5°; and the bellcrank lever 30 will rotate about 38°. The push rod 40 is usually somewhat longer than that in a constant ratio linkage but still moves in substantially the same manner. With this combination of pedal arm, connecting link, bellcrank lever, and booster push rod, the brake pedal may be located in easy reach of the driver, provide a reasonable amount of total brake pedal travel, and have sufficient push rod travel to give full stroke of the power brake booster for safe operation.

What is claimed is:

1. A variable ratio pedal linkage having a force input arm and a force output member, a first link, a bellcrank second link and a fixed link;

said force input arm having at one end a force receiving pedal and at the other end a first pivot on said fixed link;

said bellcrank second link having a second pivot on said fixed link linearly spaced from said first pivot, and third and fourth pivots thereon spaced angularly apart relative to said second pivot with said fourth pivot being linearly positioned from said second pivot, said force output member being pivotally attached to said bellcrank second link at said fourth pivot and said first link being pivotally attached to said bellcrank second link at said third pivot;

and a fifth pivot on said force input arm intermediate said first pivot and said pedal, said first link also being pivotally connected by said fifth pivot to said force input arm;

the apply direction of pivotal movement of said force input arm and the effective direction of application of input force being such that the force ratio between the input force and the output force exerted by said bellcrank second link on said output member decreases in a substantially straight line from a ratio of about 4.7:1 at the initiation of pedal movement to about 1.7:1 at full pedal movement.

2. A variable ratio pedal linkage having a force input arm and a force output member, a first link, a bellcrank second link and a fixed link;

said force input arm having at one end a force receiving pedal and at the other end a first pivot on said fixed link;

said bellcrank second link having a second pivot on said fixed link linearly spaced from said first pivot, and third and fourth pivots thereon spaced angularly apart relative to said second pivot with said fourth pivot being linearly positioned from said second pivot a distance substantially greater than the distance between said second and third pivots, said force output member being pivotally attached to said bellcrank second link at said fourth pivot and said first link being pivotally attached to said bellcrank second link at said third pivot;

and a fifth pivot on said force input arm intermediate said first pivot and said pedal and at a linear distance from said first pivot substantially equal to the linear distance between said first and second pivots, said first link also being pivotally connected by said fifth pivot to said force input arm;

the apply direction of pivotal movement of said force input arm and the effective direction of application of input force being such that the force ratio between the input force and the output force exerted by said bellcrank second link on said output member decreases in a substantially straight line from a ratio of about 4.7:1 at the initiation of pedal movement to about 1.7:1 at full pedal movement.

3. In a brake pedal assembly wherein when a fixed-ratio brake pedal lever would have a predetermined amount of arcuate pedal travel at a predetermined fixed ratio in a given installation, a variable ratio brake pedal assembly embodying the invention having in the same given installation a variable-ratio brake pedal linkage movable throughout the same predetermined amount of arcuate pedal travel from an initial ratio in the range of about 1.5 to 1.8 times said predetermined fixed ratio to a full stroke ratio in the range of about 0.5 to 0.6 times said predetermined fixed ratio, the change in said ratio occurring as a substantially straight line function of pedal travel, said variable ratio brake pedal linkage comprising:

a fixed first link having first and second pivots thereon in axially parallel and linearly spaced relation, an input lever pivoted to said first pivot, and a second link pivoted to said second pivot;

a third pivot on said input lever linearly spaced from said first pivot:

a fourth pivot and a fifth pivot on said second link;

an output member pivotally attached to said second link at said fifth pivot and movable in brake apply and release directions;

and a third link connecting said third and fourth pivots and moving said second link about said second pivot in response to movement of said input lever about said first pivot to change the linear distance between said first and fourth pivots as said input lever moves in a brake apply direction.

4. In a brake pedal assembly wherein when a fixed-ratio brake pedal lever would have a predetermined amount of arcuate pedal travel at a predetermined fixed ratio in a given installation, a variable ratio brake pedal assembly embodying the invention having in the same given installation a variable-ratio brake pedal linkage movable throughout the same predetermined amount of arcuate pedal travel from an initial ratio in the range of about 1.5 to 1.8 times said predetermined fixed ratio to a full stroke ratio in the range of about 0.5 to 0.6 times said predetermined fixed ratio, the change in said ratio occurring as a substantially straight line function of pedal travel, said variable ratio brake pedal linkage comprising;

a fixed first link having first and second pivots thereon in axially parallel and linearly spaced relation, an input lever pivoted to said first pivot, and a second link pivoted to said second pivot;

a third pivot on said input lever linearly spaced from said first pivot;

a fourth pivot and a fifth pivot on said second link positioned arcuately intermediate said second and third pivots relative to said first pivot as a center, said fifth pivot being a substantially greater linear distance than said other pivots from said fixed pivot;

an output member pivotally attached to said second link at said fifth pivot and movable in brake apply and release directions;

and a third link connecting said third and fourth pivots in tension and moving said second link about said second pivot in response to movement of said input lever about said first pivot to decrease the linear distance between said first and fourth pivots as said input lever moves in a brake apply direction.

* * * * *